(12) United States Patent
Kowalski

(10) Patent No.: US 10,630,598 B1
(45) Date of Patent: Apr. 21, 2020

(54) ADAPTIVELY MONITORING AND SCALING COLLECTIONS OF COMPUTING RESOURCES

(71) Applicant: Amazon Technologies, Inc., Seattle, WA (US)

(72) Inventor: Marcin Piotr Kowalski, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 57 days.

(21) Appl. No.: 15/951,926

(22) Filed: Apr. 12, 2018

(51) Int. Cl.
| | |
|---|---|
| *H04L 12/26* | (2006.01) |
| *H04L 12/24* | (2006.01) |
| *G06F 9/50* | (2006.01) |
| *H04L 12/911* | (2013.01) |

(52) U.S. Cl.
CPC ............. *H04L 47/70* (2013.01); *H04L 41/22* (2013.01); *H04L 41/5009* (2013.01); *H04L 43/08* (2013.01)

(58) Field of Classification Search
CPC ......... H04L 47/70; H04L 43/08; H04L 41/22; H04L 41/5009; H04L 67/1076; H04L 67/1031; H04L 43/0876; H04L 41/0893; G06F 9/5083
See application file for complete search history.

(56) References Cited

U.S. PATENT DOCUMENTS

| | | | | |
|---|---|---|---|---|
| 2008/0043622 | A1* | 2/2008 | Kamath | .................. H04L 43/08 370/235 |
| 2016/0094424 | A1* | 3/2016 | Niestemski | ......... H04L 41/0823 709/224 |
| 2016/0323377 | A1* | 11/2016 | Einkauf | .............. H04L 67/1076 |
| 2017/0230266 | A1* | 8/2017 | Smola | ................. H04L 43/0876 |
| 2017/0257303 | A1* | 9/2017 | Boyapalle | .............. H04L 67/34 |

\* cited by examiner

*Primary Examiner* — Soe Hlaing
(74) *Attorney, Agent, or Firm* — Nicholson De Vos Webster & Elliott LLP

(57) ABSTRACT

Techniques are described for automatically adapting conditions associated with triggers used to monitor the performance of computing resources managed by a service provider or other entity. The monitored computing resources can include, for example, virtual machines (VMs), physical servers, applications, or any combinations thereof. Metric data generated by or otherwise obtained from the monitored computing resources—for example, metrics measuring CPU utilization, network latency, or other performance characteristics of the computing resources—is collected and tracked by a monitoring service of a service provider network. The monitoring service can be used generally to monitor and track computing resource utilization, application performance, and operational health of one or more computing resources based on collected metric data.

20 Claims, 8 Drawing Sheets

US 10,630,598 B1

ADAPTIVELY MONITORING AND SCALING COLLECTIONS OF COMPUTING RESOURCES

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies can provide virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
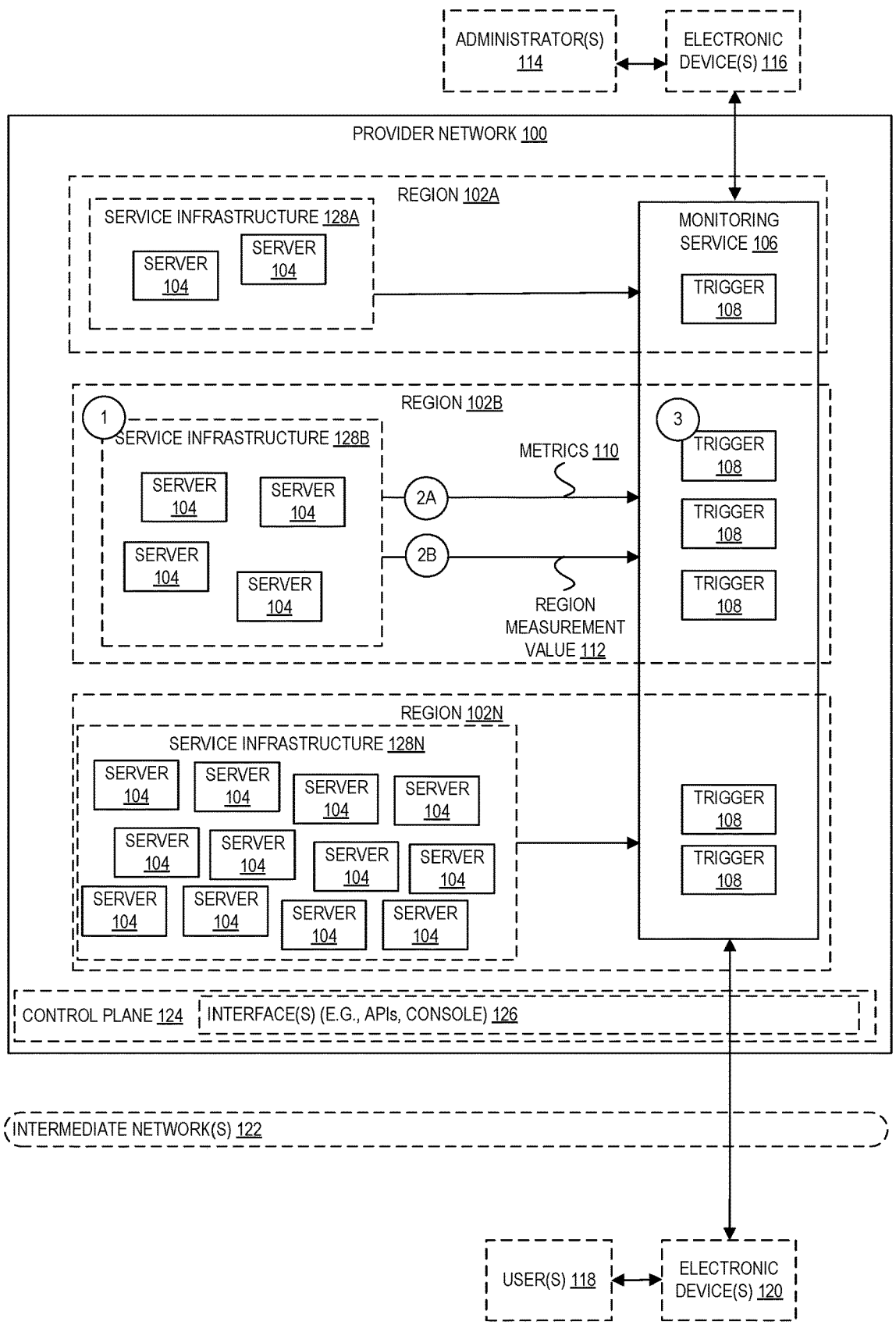
FIG. 1 is a diagram illustrating an environment for automatically adapting the conditions associated with triggers used to monitor the performance of computing resources managed by a service provider or other entity according to some embodiments.

Various embodiments of methods, apparatus, systems, and non-transitory computer-readable storage media are described for automatically adapting conditions associated with triggers used to monitor the performance of computing resources managed by a service provider or other entity. The monitored computing resources can include, for example, virtual machines (VMs), physical servers, services, applications, or any combinations thereof. In an embodiment, metric data generated by or otherwise obtained from the monitored computing resources—for example, metrics measuring CPU utilization, network latency, input/output operations per second (IOPS), or other performance characteristics of the computing resources—is collected and tracked by a monitoring service of a service provider network. The monitoring service can be used generally to monitor and track computing resource utilization, application performance, and operational health of one or more computing resources based on collected metric data.

In some embodiments, a monitoring service enables users to define triggers that can be used to detect when metric data collected from a set of computing resources, or statistics generated from the metric data, meets one or more conditions (for example, when the data exceeds or falls below one or more defined thresholds) for a specified number of time periods. A system administrator, for example, might configure a trigger with conditions that are met when the average network latency of one or more computing resources managed by the system administrator exceeds 200 milliseconds for more than three consecutive 1-minute time periods. The satisfaction of the trigger conditions may alert the system administrator that at least some users of the computing resources are experiencing poor performance, that one or more SLAs are in danger of being violated, or more generally that additional capacity is needed to support the computing resources. The trigger may be configured to cause the monitoring service to perform a defined set of actions when the conditions are met such as, for example, generating a notification, modifying the computing resources, or launching additional computing resources.

The ability to use a monitoring service to monitor computing resource performance and the use of triggers can be helpful for the reasons stated above and others. However, the accurate configuration of trigger conditions for a collection of computing resources presents a number of challenges. For example, trigger conditions typically are configured in an ad hoc manner and based on the current state of a set of computing resources. Consider an trigger that is initially set to alert a system administrator when the 95th percentile of metric data measuring network latency for a monitored set of computing resources exceeds a defined threshold for a specified number of time periods. When the number and activity level of the computing resources is relatively small, the conditions associated with the trigger may be met by a relatively small subset of outlier computing resources and may not accurately reflect the health of the computing resources as a whole. Thus, the administrator may manually adjust the trigger conditions to instead measure the 60th percentile while the region is small, or the administrator may increase the specified number of time periods associated with the trigger, to better measure the computing resources. The administrator may then be responsible again for adjusting the measured percentile, the number of time periods, or other aspects of the trigger as the scale of the monitored computing resources increases or decreases in size over time, which can be an error prone process. The misconfiguration of such triggers can have both direct and downstream consequences. For example, triggers may be used to drive other system processes and infrastructure scaling solutions, such as host scaling and the like, but these tools may not operate as desired if the triggers are misconfigured.

According to embodiments described herein, a monitoring service is configured to automatically adapt conditions associated with such triggers over time as a monitored collection of computing resources changes, either in terms of the number of computing resources, the activity level of the computing resources, or based on any other measurement of the scale of the computing resources. For example, a monitoring service may periodically obtain, from a capacity monitoring service or other source, one or more values indicating an activity level or other measurement of a monitored collection of computing resources. In an embodiment, the monitoring service can use the obtained value(s) to determine whether to adapt one or more triggers, and if so, can adapt one or more conditions associated with the triggers accordingly. For example, if a monitored set of computing resources has significantly increased or decreased in number or activity level, the monitoring service may adapt one or more associated triggers by selecting a different metric percentile to measure, selecting a different number of time periods associated with trigger conditions, or by performing any other modification to better reflect the current state of the computing resources being measured.

In one embodiment, a monitored set of computing resources includes resources co-located in a region of a plurality of geographic regions defined by a service provider network or other entity. For example, a service provider network allows users to use a variety of types of computing resources, such as compute capacity (for example, virtual machine (VM) instances, containers, batch jobs, code execution without provisioning services), data and storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. A service provider network typically provides these and other computing resources as services, such as a hardware virtualization service that can execute VM instances and other types of compute capacity, a storage virtualization service that can store data objects, and so forth. The users (or "customers") of a service provider network may use one or more user accounts that are associated with a customer account to access such computing resources, though these terms can be used somewhat interchangeably depending upon the context of use.

The services offered by a service provider network may be supported by servers and other infrastructure located in data centers around the world. These data centers may be geographically and logically grouped into a set of regions, each region representing a separate geographic area (for example, one or more data centers may be grouped into a U.S. East Region, another one or more data centers grouped into a U.S. West Region, yet another one or more data centers grouped into an Asia Northeast Region, and so forth). In some cases, each region is designed to be completely isolated from other regions to achieve fault tolerance and stability in the case of power outages, natural disasters, or other significant events affecting a particular region.

Each service offered by a service provider network may run on servers located in some or all of the regions defined by the service provider network. When a customer uses a hardware virtualization service to launch a new VM, for example, the customer may select a region in which to launch the VM from a list of available regions that support the service. A customer might select one region over another for any number of reasons including to reduce latency (for example, because other system components with which the VM is to interact are located in or near the same region), to minimize costs, or to address regulatory requirements. The demand for and use of a service in a region can increase over time and may prompt the service provider to add additional servers in a region to support the growth and possibly to add additional regions.

Similarly, a customer of a service provider network may deploy an application or service in one or more separate regions as demand for the customer's application grows, or an entity may deploy and monitor separate groups of hardware and software resources outside of a service provider network. As described herein, the demand for and scale of computing resources in various regions, or generally for any defined groups of computing resources, can be tracked by a monitoring service and managed by triggers which can be used to drive other processes to efficiently and accurately scale the computing resources.

FIG. 1 is a block diagram illustrating an environment for automatically adapting conditions associated with triggers used to monitor the performance of computing resources managed by a service provider network or other entity. In some embodiments, a service provider network 100 comprises a plurality of regions 102A-102N, each region including some number of computing resources (for example, servers 104 in FIG. 1), a monitoring service 106, among other possible components. In one embodiment, the servers 104 may support any number of services offered by the service provider network 100 (for example, a hardware virtualization service, storage virtualization service, and so forth) and are located at one or more geographic locations and data centers managed by the service provider. A relatively small number of servers 104 and regions 102A-102N are shown in FIG. 1 for illustrative purposes; actual service provider networks 100 can include many thousands of computing resources located in each region and can include any number of separate regions.

As indicated above, a service provider network 100 provides users with the ability to use one or more of a variety of types of computing-related resources such as compute resources, data/storage resources, network-related resources, application resources, and so forth. These and other computing resources may be provided as services, such as a hardware virtualization service that can execute compute instances, a storage virtualization service that can store data objects, etc. Users may interact with a provider network 100 across one or more intermediate networks 122 (for example, the internet) via one or more interface(s) 126, such as through use of application programming interface (API) calls, via a console implemented as a website or application, etc. The interface(s) 126 may be part of, or serve as a front-end to, a control plane 124 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, it is desirable at times for users to monitor the performance of a collection of computing resources over time, such as a collection of servers 104 located in a region of a service provider network 100. For example, a system administrator 114 responsible for administering the computing resources supporting a service offered by the service provider network 100 in a region might monitor the computing resources to ensure that users of the service are experiencing good performance. To monitor the computing resources in a region, a system administrator may use a monitoring service 106 to configure one or more triggers 108 to monitor CPU usage, network latency, or any other performance characteristics associated with the computing resources in the region, for example, so that action can be taken if performance is unacceptable for a significant number of users. As another example, a user 118 that is a customer of the service provider might monitor and create triggers 108 for a collection of computing resources provisioned by the user at the service provider network 100 in a particular region. More generally, users can use a monitoring service 106 to monitor collections of computing resources that the user expects to increase or decrease in scale (for example, based on number or activity level) over time.

In an embodiment, a collection of monitored computing resources may periodically send or "publish" metrics to a monitoring service 106. The monitoring service 106 collects and tracks metric data generated by computing resources and, based on triggers 108 that can be configured by users of the service, can perform a defined set of one or more actions when conditions associated with a trigger are met. For example, at the circle labeled "1" in FIG. 1, the servers 104 located in region 102B generate various metrics during operation of the servers. According to some embodiments, the metrics may be generated by the computing resources (for example, by a monitoring agent or other application associated with the computing resources) or obtained from the computing resources by an external monitoring component. In one embodiment, a metric is a time-ordered set of data points measuring some characteristic of one or more computing resources. For example, an administrator responsible for managing operation of servers 104 supporting a service infrastructure 128B in region 102B may configure the servers 104 to generate and publish metrics such as, for example, a metric that measures network latency of the computing resources, another metric measuring CPU utilization, another metric measuring IOPS, and so forth. As another example, a customer of the service provider network 100 may configure a set of VMs the customer has provisioned in a region to report similar metrics, or to report custom metrics of interest to the customer (for example, metrics that are specific to one or more user applications supported by the monitored computing resources).

In an embodiment, a monitoring service 106 provided by the service provider network 100 obtains metric data from computing resources, such as the metric data generated above in circle "1." For example, at the circle labeled "2A," the metrics 110 generated by the servers at circle "1" are sent or published to a monitoring service 106. The metrics 110 may sent to the monitoring service 106 using API calls or any other type messaging between the computing resources and the monitoring service 106. In an embodiment, the monitoring service 106 stores the metrics in a data store or other storage location and, in the case of metrics generated by computing resources associated with a customer account, the metrics can be stored in association with an identifier of the customer's account.

According to embodiments described herein, a monitoring service 106 also periodically receives values indicating a total number, an activity level, or other measurement of a collection of computing resources being measured by one or more of the triggers 108. As described below, these values can be used to determine whether to adapt one or more triggers to account for changes to a monitored set of computing resources. For example, at the circle labeled "2B" in FIG. 1, the monitoring service 106 periodically obtains one or more region measurement values 112 indicating information about the size or activity of the region 102B. In one embodiment, the monitoring service 106 obtains the one or more region measurement values 112 from a capacity tracking system in the region that tracks information about the components in each region or from any other source of information about the region. Although in FIG. 1 the values obtained by the monitoring service 106 indicate information about a collection of computing resources defined by a region, in other examples, the values may generally provide information about a set of computing resources of interest and may not be specific to a region grouping. As indicated above, the measurement values obtained by the monitoring service 106 can include any information indicating a size or activity level of a collection of computing resources such as, for example, a total number of computing resources in the collection, a total number of users using the computing resources, a total number of unique users accessing the computing resources, a number of requests received by the computing resources, one or more values indicating a workload currently associated with the computing resources, and so forth.

In an embodiment, a value indicating a size or activity level of a collection of computing resources may also be derived from the metrics 110. For example, the value may be based on a number of samples of the metric data received per unit time (where a greater number of samples per unit time may indicate a greater level of activity of the computing resources). The values can include other information about a collection of computing resources including whether the computing resources are production or non-production resources, whether the collection of computing resources is currently undergoing testing, an age of the computing resources, and so forth.

At the circle labeled "3," the monitoring service 106 obtains the metrics 110 and the region measurement values 112 and performs various operations, including the possible adaptation of one or more triggers 108. For example, the monitoring service 106 may store the metrics 110 in a data store or other storage location, generate statistics based on the metrics, compare the metrics and statistics against triggers 108, perform actions in response to trigger conditions being met, generate and cause display of graphical user interfaces (GUIs) displaying metrics, statistics, and trigger information, among other possible operations.

In an embodiment, the monitoring service 106 may generate statistics based on the collected metric data 110 as configured by a user. Examples of statistics that a monitoring service 106 may generate based on collected metric data include, but are not limited to, minimums (a lowest observed value during a specified time period), maximums (a highest observed value during a specified time period), a sum (all values associated with a metric during a specified time period added together), an average (the sum of a metric divided by the number of samples collected during a specified time period), a sample count (a count of data points used for a statistical calculation), and a percentile (the value of the specified percentile). In an embodiment, a statistic can have a unit measure such as, for example, bytes, seconds, counts, or a percent. In an embodiment, the statistics generated by a monitoring service 106 based on collected metric data 110 may be used to generate graphical displays (for example, to display graphs showing averages, maximums, or other statistics based on collected metric data), as part of trigger configurations (for example, a trigger may be configured with a threshold based on an average, maximum, or percentile of the metric data), or for other purposes.

As indicated above, one type of statistic that may be generated by a monitoring service 106 based on collected metric data is a percentile. A percentile indicates the relative standing of a value in a dataset during a specified period of time. For example, a value representing the 95$^{th}$ percentile means that 95 percent of the data is lower than the value and 5 percent of the data is higher than the value. Percentiles can help users to isolate anomalies and better understand the distribution of metric data 110 collected by a monitoring service 106. For example, consider an administrator 114 monitoring the CPU utilization of servers 104 to ensure that customers of the service supported by the servers experience good performance. If the administrator 114 monitors an average CPU utilization, this can hide anomalies, and if the user monitors the maximum, a single anomaly can skew the results. However, by using percentiles, the administrator 114 can monitor the 95$^{th}$ percentile of CPU utilization to check for servers with an unusually heavy load. In examples provided herein, a percentile may be specified using the notation pNN, where NN corresponds to the percentile. For example, the notation p50 represents the value of the 50$^{th}$ percentile, whereas the notation p95 represents the value of the 95$^{th}$ percentile.

In an embodiment, users can configure triggers 108 to monitor metrics, or statistics generated from the metrics, collected by the monitoring service 106 and to determine when the metrics satisfy one or more defined conditions (for example, determine when a metric exceeds a defined threshold). In the example of an administrator 114 responsible for managing a service of the service provider network 100 operating in a region, triggers can be used to track growth of the region and to ensure that enough capacity is available to satisfy any SLAs and to provide a good customer experience generally. As another example, a user 118 may configure one or more triggers 108 to monitor computing resources provisioned by the user in a region to support one or more applications provided by the user. In an embodiment, an administrator or other user may use a console 126 or other interface to configure triggers and associated conditions.

In an embodiment, an trigger 108 can be used to automatically initiate actions on a user's behalf if conditions associated with the trigger are satisfied. For example, based on a configured trigger 108, a monitoring service 106 watches a metric over a specified time period may perform one or more specified actions based on the value of the metric relative to a threshold over time (for example, depending on whether the monitored value exceeds a threshold for a specified number of time periods, falls below a threshold for a specified number of time periods, or if data points are missing for a specified number of time periods). In other words, a monitoring service 106 invokes actions based on an trigger 108 for sustained state changes, that is, when a threshold is exceeded (or the data falls below a threshold) for a specified number of periods. In some embodiments, the actions that a monitoring service 106 may perform in response to trigger conditions being met include generating one or more notifications, performing actions based on an auto scaling policy, or any other defined operations. In an embodiment, triggers 108 can be added to dashboards of a graphical user interface (GUI) to visually present to users collected metric data compared to configured trigger thresholds or other conditions.

Figure 2:
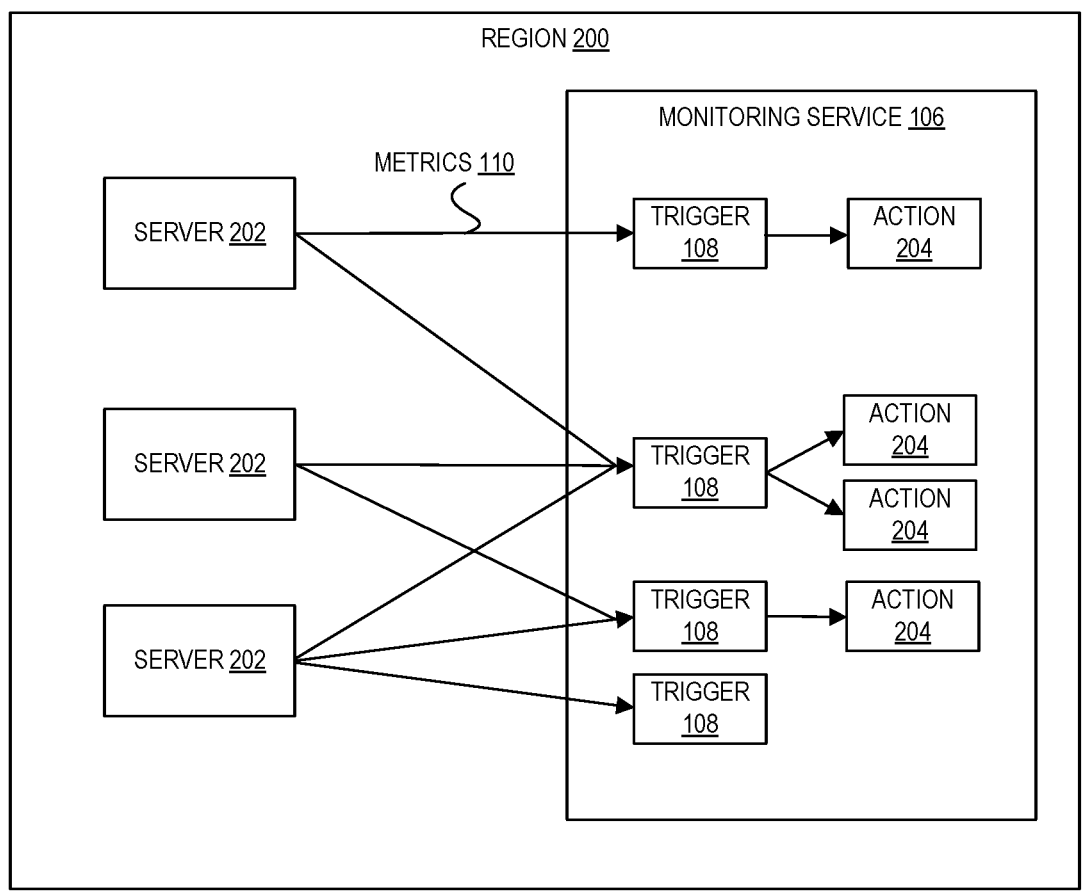
FIG. 2 is a diagram illustrating example relationships between a monitored set of computing resources, triggers configured to monitor metric data generated by the computing resources, and actions to be performed in response to conditions associated with a trigger being met according to some embodiments.

FIG. 2 is a block diagram illustrating example relationships between metrics, triggers, and actions. In the example of FIG. 2, servers 202 within a region 200 may support a service provided by a service provider network 100 or otherwise be associated with an external customer or other entity responsible for managing a collection of computing resources. Similar to the servers 104 shown in FIG. 1, the servers 202 in FIG. 2 are configured to publish metrics 110, which can include any type of data measuring one or more performance characteristics of the servers 202. As shown in FIG. 2, metrics 110 are generated by some or all of the servers 202 in a region 200 and obtained and analyzed by a monitoring service 106.

In an embodiment, the analysis of the metrics 110 can include comparing the metrics or statistics generated therefrom against conditions associated with one or more triggers 108. For example, the monitoring service 106 compares metrics 110 generated by servers 202 against the triggers 108, where some triggers analyze metrics received from a single computing resource while other triggers analyze metrics received from multiple different computing resources. As indicated above, the triggers 108 may be configured to measure CPU utilization, network latency, or any other performance characteristics of the servers 202 against conditions associated with the triggers (for example, one or more thresholds and associated time periods).

In an embodiment, the monitoring service 106 is configured to invoke one or more specified actions 204 in response to the triggering of a trigger. As shown in FIG. 2, each trigger 108 is configured to invoke zero or more actions 204 whenever conditions associated with the trigger are satisfied.

As indicated above, the actions 204 can include generating notifications, modifying computing resources, launching additional computing resources, or any other defined operations.

In one embodiment, a monitoring service 106 can adapt one or more triggers 108 based on the metric data and the values indicating a number of computing resources or activity level of the computing resources (for example, the metrics 110 and region measurement value(s) 112 in FIG. 1). The adaptation of triggers can include modifying any properties of the triggers such as, for example, modifying a statistic used by the trigger, modifying a number of time periods associated with trigger conditions, modifying a number of missing data points associated with trigger conditions, or any other modifications. For example, the triggers can be adapted by checking the size or activity level of the region periodically to determine whether to adapt one or more triggers. In one embodiment, the properties of an trigger can be adapted linearly based on the size or activity level of a monitored collection of computing resources. As one example, a trigger that is initially configured to measure the $50^{th}$ percentile of a metric against a threshold can be modified to measure the $60^{th}$ percentile, $70^{th}$ percentile, $80^{th}$ percentile, and so forth, linearly with growth of the computing resources. As another example, trigger conditions that measure a metric based on five-minute time periods when a region is small can be modified to measure four-minute time periods, 3-minute time periods, and so forth as the computing resources in the region grow in size or activity level.

In some embodiments, a mapping between the size and activity levels of a collection of computing resources and trigger properties can be generated using machine learning (ML) techniques. For example, an ML model can be generated and used to determine when to adapt one or more triggers based on changes to the number and activity levels of computing resources, which aspects of triggers to vary based on changes to the number and activity levels of the computing resources (for example, whether to vary a number of time periods, measured percentiles, other trigger properties, or combinations thereof), or to identify other relationships between trigger conditions and the scale of a collection of computing resources.

In one embodiment, a monitoring service 106 can adapt triggers based on an activity level of a set of computing resources that exhibits one or more regular patterns. For example, a monitoring service 106 may store data indicating a sample rate for a particular metric and create a function that adapts a measured percentile or other trigger property dynamically based on the sample rate. This type of adaptation, for example, can help triggers account for fluctuations in computing resource activity levels that occur each day (for example, where resources may be more active during day time hours compared to night), each week (for example, where resources may be more active during workdays compared to weekends), and so forth.

In many of the examples described above, the use of metric data and computing resource scaling information can be used to adapt triggers configured at a monitoring service 106. In some embodiments, other aspects of an IT infrastructure can be scaled based on the same or similar data. For example, an administrator of a service running at a provider network 100 may initially configure the software supporting to the service with certain values, such as heap sizes for application servers and other software parameters. The administrator may typically be tasked with modifying these values manually as the size and activity level of resources in the region changes over time. In one embodiment, a monitoring service 106 may instead automatically adapt these software parameters over time as information about the scale of the associated computing resources is received. As another example, various configurations related to databases or other applications can be automatically scaled over time based on metric data, activity level information, and so forth.

In one embodiment, the selection of initial trigger conditions (thresholds, time periods, and so forth), SLA values, and other system parameters can be based on modeling and monitoring collections of computing resources. For example, administrators may typically manually select values for initial trigger thresholds, SLAs parameters, and so forth based on best guesses. In some embodiments, an administrator can instead configure a system with initial values, inject test load into the system, and monitor the system to determine if the values are to be adapted, as described herein.

Figure 3:
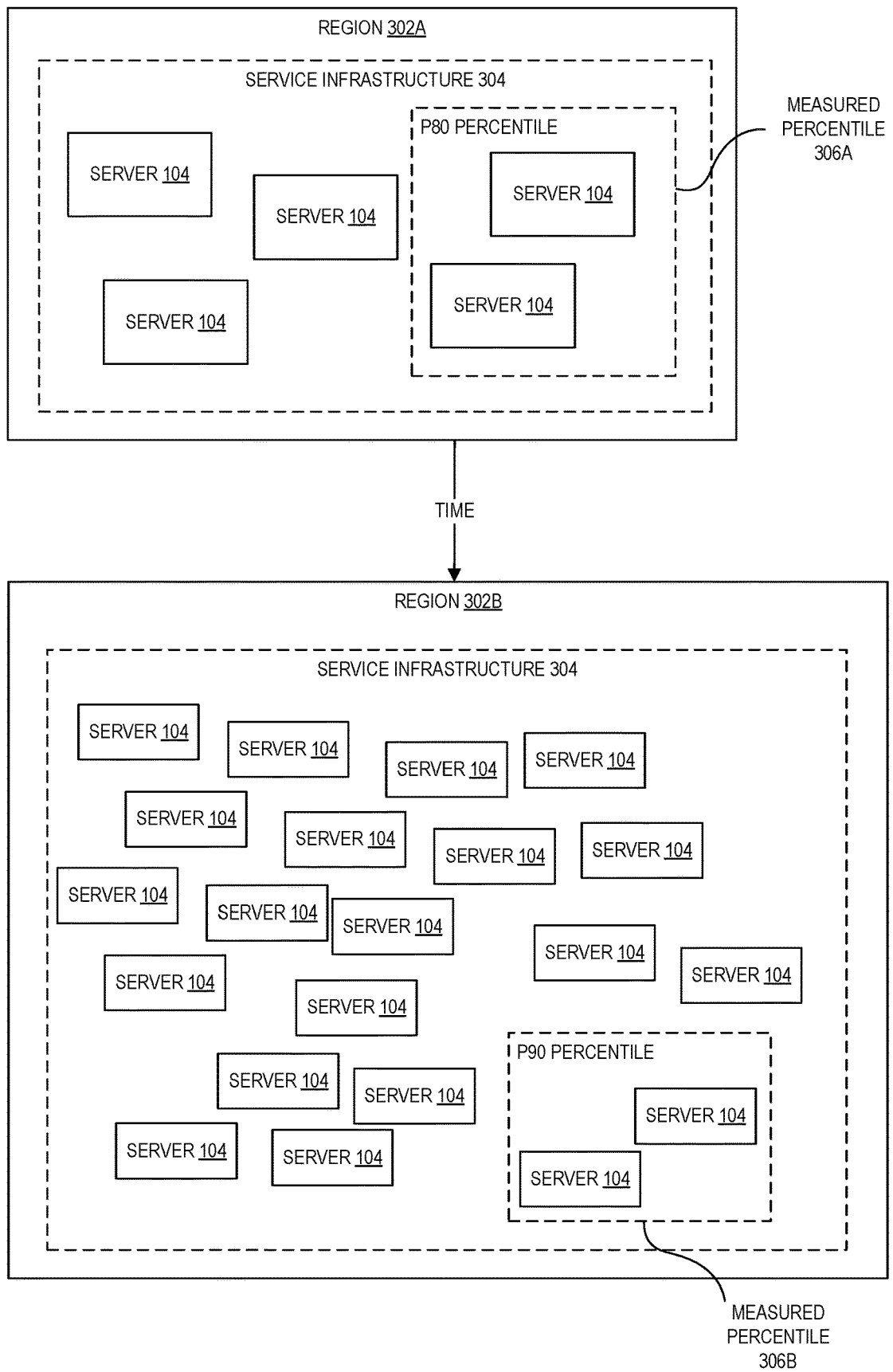
FIG. 3 is a diagram illustrating the adaptation of a percentile statistic used to determine when conditions associated with a trigger are met according to some embodiments.

FIG. 3 is a block diagram illustrating an example of adapting a percentile monitored by a trigger as a collection of servers increases in size according to some embodiments. FIG. 3 for example shows a region 302A at a first point in time and including a service infrastructure 304 comprising a relatively small number of servers, and shows the same region 302B at a later time when the region includes a larger number of servers. For example, the state of region 302A may represent a time early in the region's existence when demand for service provided by the service infrastructure 304 was relatively low and the state of the region 302B represents a later time when additional servers were added to accommodate growing demand. The example shown in FIG. 3 illustrates a region growing in size in terms of the number of servers that exist in the region. As indicated above, a collection of computing resources can also change in size in other ways including the activity level of the computing resources (for example, based on a number of requests processed by the servers, a number of computing resources supported by the servers, a number of customers using the servers, or any other measure of server activity).

The example shown in FIG. 3 assumes that a user initially has configured a trigger set to measure the $80^{th}$ percentile of a metric for the servers 104 in region 302A. For example, the measured percentile 306A shows an example set of two servers 104 that might be captured by the $80^{th}$ percentile statistic. If the same trigger was instead configured to be based on the $90^{th}$ percentile, metrics associated with a single outlier server could possibly satisfy the trigger conditions. Thus, the $80^{th}$ percentile might provide a better representation of the overall performance of the servers 104 initially in the region.

In FIG. 3, the region 302B has grown in terms of the number of servers and the measured percentile 306B has been updated accordingly to instead measure the $90^{th}$ percentile of a monitored metric. For example, the update to the measured percentile may be performed automatically by a monitoring service 106 based on information indicating the increase in the number of servers 104 in the region 302B. As shown, the $90^{th}$ percentile may provide a better measure the activity of the increased number of servers 104 in the region 302B compared to the $80^{th}$ percentile.

Figure 4:
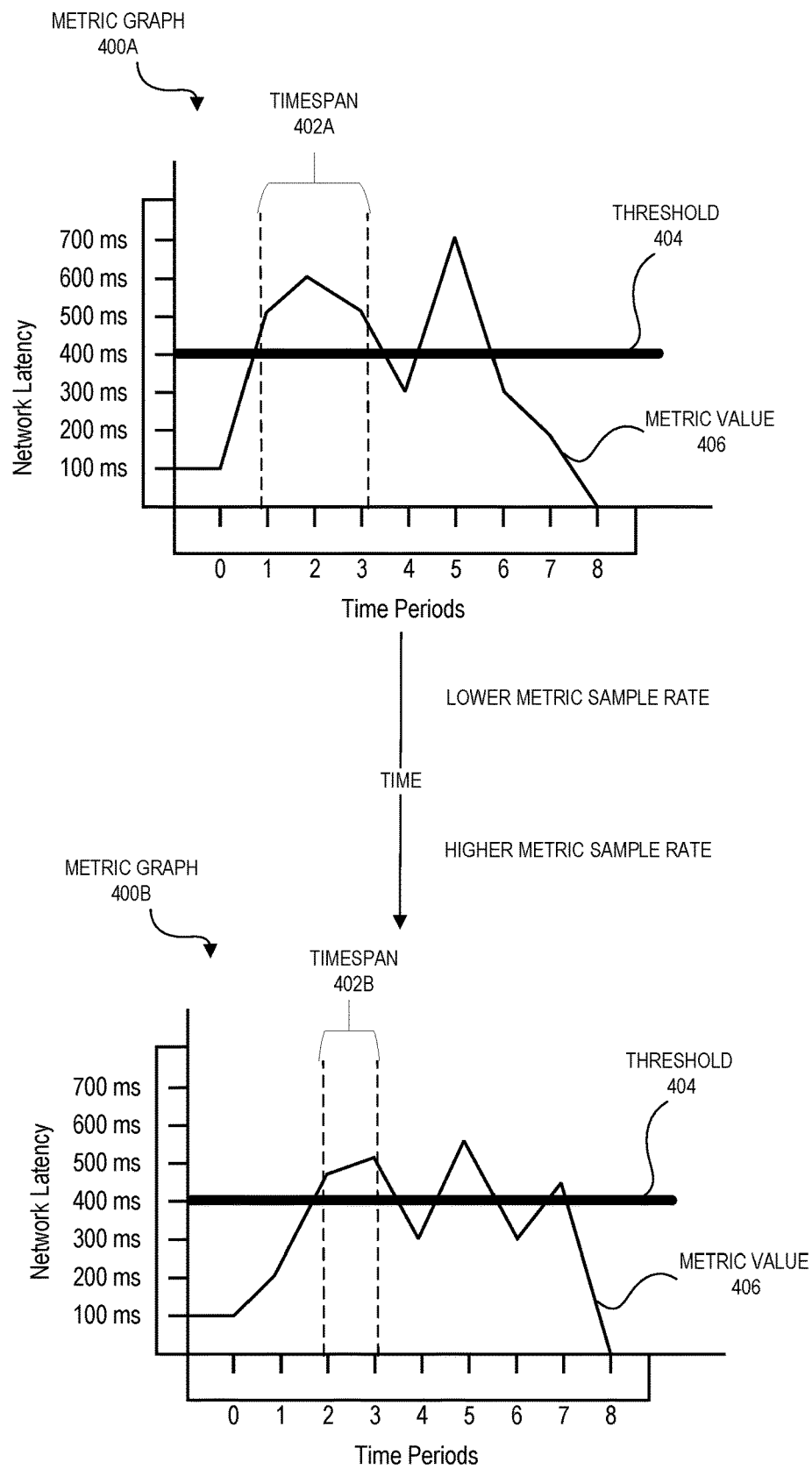
FIG. 4 is a diagram illustrating the adaptation of a number of time periods associated with a trigger used to monitor a metric or a metric statistic according to some embodiments.

FIG. 4 is a diagram illustrating the adaptation of a number of time periods associated with a trigger used to monitor a metric or a metric statistic. For example, the metric graphs 400A and 400B illustrate a monitored metric over two different periods of time, each graph including a y-axis measuring network latency for a collection of computing resources (which may be measured as an average, maximum, minimum, percentile, or other statistic) and an x-axis indicating a series of time periods for the measurements. As shown, the metric value 406 varies over time relative to a defined threshold 404 in each graph. The graph 400A represents a period of time when the metric sample rate is relatively low (for example, because the number and activity level of the monitored resources is small) compared to the period of time represented by graph 400B.

As shown, FIG. 4 illustrates that a number of time periods associated with a trigger can be adapted as the sample rate of a metric or other property of the monitored computing resources changes over time. In this example, a trigger is initially configured with trigger conditions that are met when the metric value 406 exceeds the defined threshold 404 for at least three time periods and, thus, the conditions are satisfied during the timespan 402A but not during subsequent periods where the metric value exceeds the threshold. The graph 400B illustrates that the trigger has been adapted to reduce the number of time periods needed to satisfy the trigger conditions (from three to two time periods), for example, because the sample rate of the metric value 406 has increased. In graph 400B, the conditions are satisfied during the timespan 402B but not during subsequent periods where the metric value exceeds the threshold for only one time period.

Figure 5:
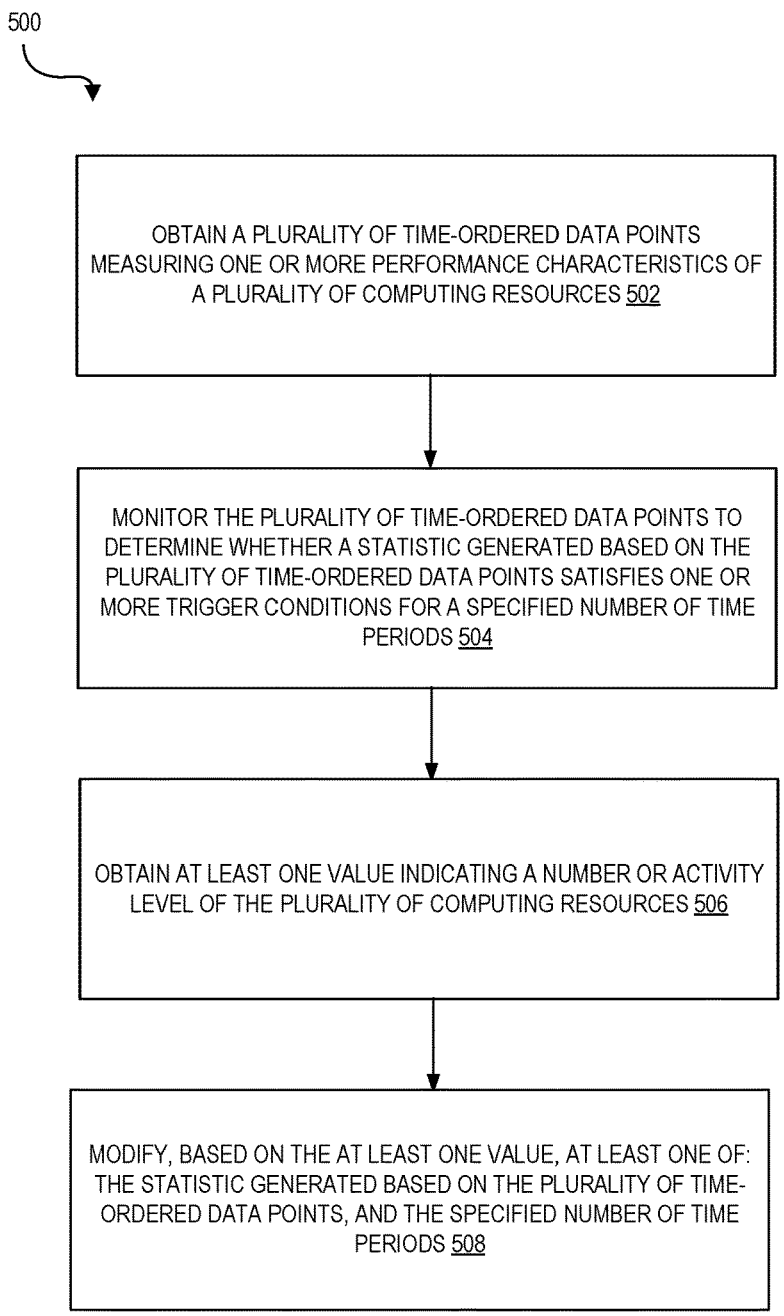
FIG. 5 is a flow diagram illustrating an example process for adapting one or more conditions associated with a trigger used to monitor the performance of computing resources managed by a service provider or other entity according to some embodiments.

FIG. 5 is a flow diagram illustrating operations 500 for automatically adapting conditions associated with triggers used to monitor the performance of computing resources according to some embodiments. Some or all of the operations 500 (or other processes described herein, or variations, or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a monitoring service 106 or other component of the other figures.

The operations 500 include, at block 502, obtaining a plurality of time-ordered data points measuring one or more performance characteristics of a plurality of computing resources. In one embodiment, the plurality of computing resources operate in a region of a plurality of regions of a service provider network. In one embodiment, the one or more performance characteristics include one or more of: CPU utilization, memory utilization, network latency, and disk space utilization. In an embodiment, the plurality of computing resources include one or more of: a physical server, a virtual machine (VM), an application, a service of a service provider network.

In an embodiment, at block 504, the monitoring service monitors the plurality of time-ordered data points to determine whether a statistic generated based on the plurality of time-ordered data points exceeds a threshold for a specified number of time periods. In one embodiment, the monitoring service determines that the statistic exceeds the threshold for the specified number of time periods and, in response, performs one or more defined actions. The one or more defined actions may include, for example, generating a notification, modifying one or more of the plurality of computing resources, or launching additional computing resources.

In an embodiment, at block 506, the monitoring service obtains at least one value indicating a number or activity level of the plurality of computing resources. In one embodiment, the at least one value is a region measurement value indicating a number or activity level of the plurality of computing resources operating in a region. In one embodiment, a value of the at least one value is based on a sample rate of the plurality of time-ordered data points. In an embodiment, a value of the at least one value includes a number of the plurality of computing resources, a number of customers associated with the plurality of computing resources, a number of requests received by the plurality of computing resources.

In an embodiment, at block 508, the monitoring service modifies, based on the at least one value, at least one of: the statistic generated based on the plurality of time-ordered data points, and the specified number of time periods. In one embodiment, the statistic is a percentile of the plurality of time-ordered data points at a point in time.

In one embodiment, modifying the trigger includes selecting a different percentile to use to generate the statistic. For example, the monitoring service may adapt a trigger to measure the $90^{th}$ percentile instead of the $80^{th}$ percentile to account for an increase in the number of computing resources. In an embodiment, the modifying may include modifying one or more properties of software associated with the plurality of computing resources. For example, the modifying may include adjusting heap size configurations, database configurations, or any other software-based parameters associated with the plurality of computing resources. In one embodiment, the modifying is based on a machine learning model that maps values to types of modifications.

In one embodiment, a graphical user interface (GUI) is displayed including a graph representing the plurality of time-ordered data points relative to the threshold.

Figure 6:
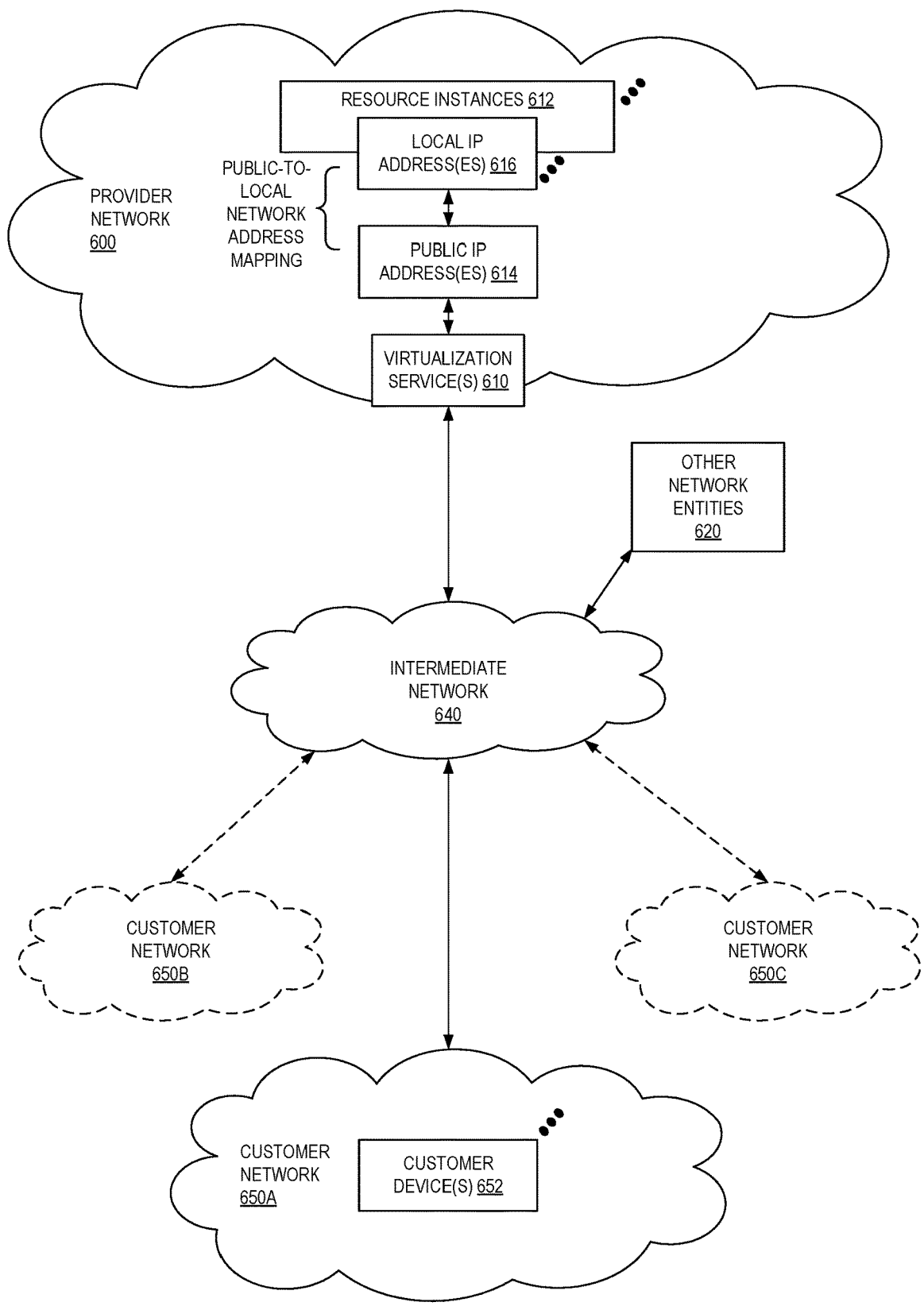
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (for example, Internet Protocol version 4 (IPv4) or Internet Protocol version 6 (IPv6) addresses) that customers may obtain from the provider 600.

Conventionally, the provider network 600, via the virtualization services 610, may allow a customer of the service provider (for example, a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
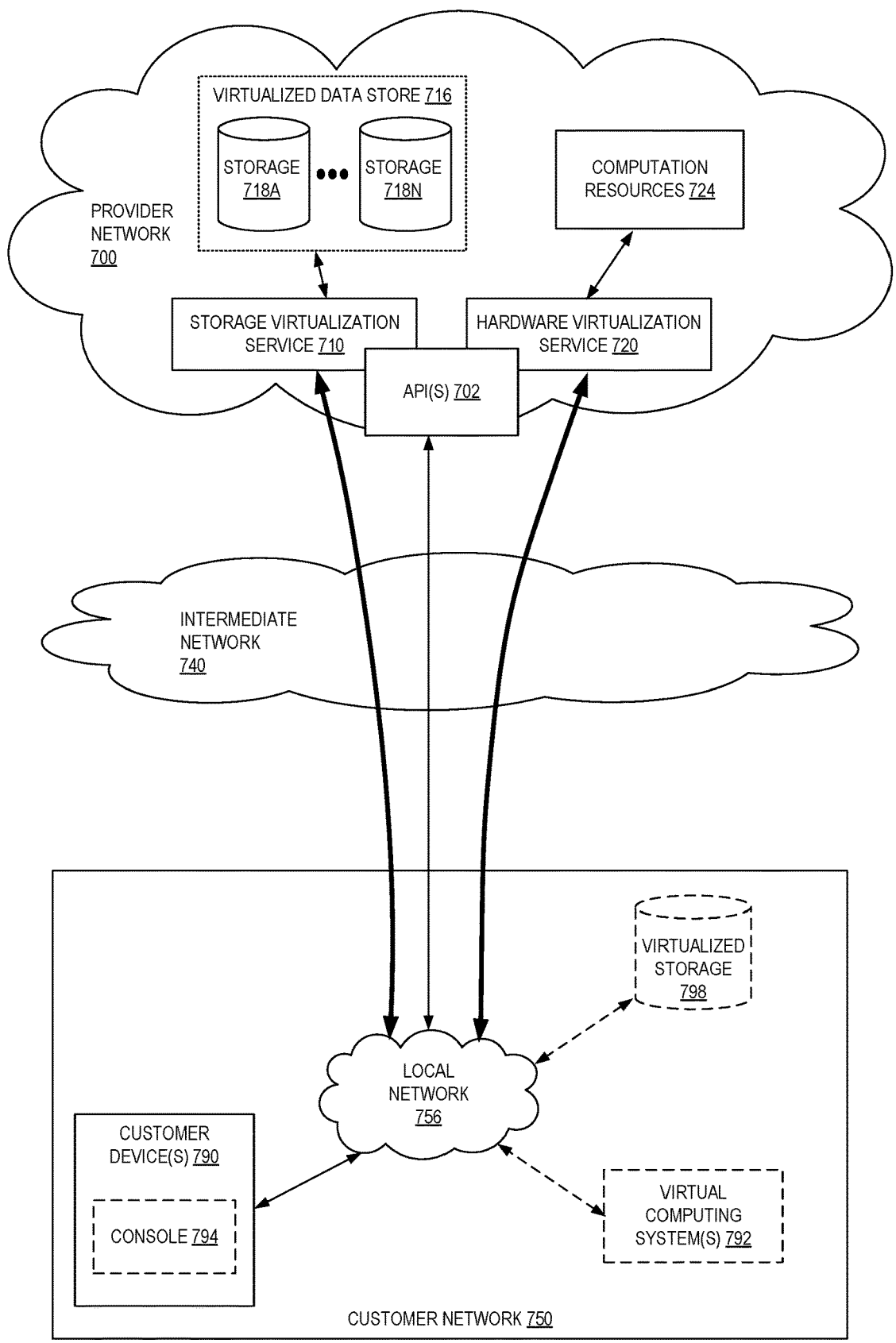
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (for example, VMs) to customers. The computation resources 724 may, for example, be rented or leased to customers of the provider network 700 (for example, to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (for example, a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (for example, via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
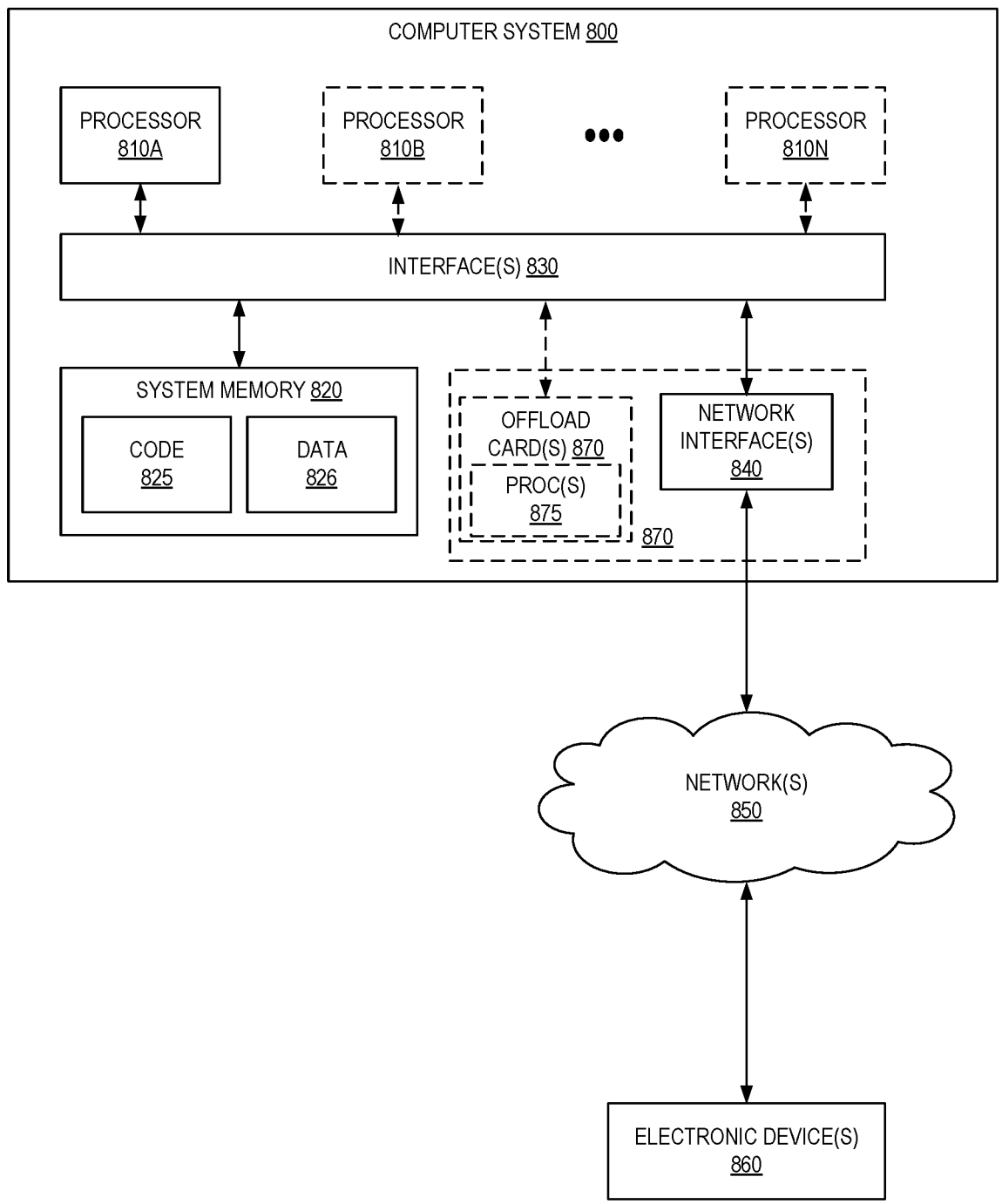
FIG. 8 is a block diagram illustrating an example computer system that may be used in some embodiments.

In some embodiments, a system that implements a portion or all of the techniques for automatically adapting the conditions associated with triggers used to monitor the performance of computing resources managed by a service provider or other entity as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (for example, two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (for example, system memory 820) into a format suitable for use by another component (for example, processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (for example, a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (for example, operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (for example, upon a request from a hypervisor) that is executed by the other processors 810A-810N of the computer system 800. However, in some embodiments the virtualization manager implemented by the offload card(s) 870 can accommodate requests from other entities, and may not coordinate with (or service) any hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 800 via I/O interface 830. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 102A-102N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining, from a plurality of computing resources operating in a region of a plurality of regions of a service provider network, a first plurality of time-ordered data points measuring one or more performance characteristics of the plurality of computing resources;
    determining whether the first plurality of time-ordered data points satisfies a first trigger condition by:
    generating a plurality of time-ordered statistical values by applying a first statistical calculation to the first plurality of time-ordered data points, and
    determining whether time-ordered statistical values from the plurality of time-ordered statistical values satisfy a threshold for a first defined number of time periods;
    obtaining a region measurement value indicating at least one of: a change in a number of computing resources operating in the region, or a change in an activity level of the plurality of computing resources operating in the region;
    modifying, based on the region measurement value, the first trigger condition to obtain a second trigger condition, wherein modifying the first trigger condition includes at least one of:
    changing the first statistical calculation to a second statistical calculation, or
    changing the first defined number of time periods to a second defined number of time periods;
    obtaining a second plurality of time-ordered data points measuring the one or more performance characteristics of the plurality of computing resources; and
    determining whether the second plurality of time-ordered data points satisfies the second trigger condition.

2. The computer-implemented method of claim 1, wherein the first statistical calculation includes determining a percentile of the first plurality of time-ordered data points at a point in time, and wherein changing the first statistical calculation to the second statistical calculation includes selecting a different percentile to use for the second statistical calculation.

3. The computer-implemented method of claim 1, wherein the region measurement value includes one or more of: a number of computing resources in the region, a number of customers associated with computing resources in the region, a number of requests received by computing resources in the region, a sample rate of the first plurality of time-ordered data points.

4. A computer-implemented method comprising:
    obtaining a first plurality of time-ordered data points measuring one or more performance characteristics of a plurality of computing resources of a service provider network;
    determining whether the first plurality of time-ordered data points satisfies a first trigger condition by:
    generating a plurality of time-ordered statistical values by applying a first statistical calculation to the first plurality of time-ordered data points, and
    determining whether time-ordered statistical values from the plurality of time-ordered statistical values satisfy a threshold for a first defined number of time periods;
    obtaining a value indicating at least one of: a change in a number of computing resources in the plurality of computing resources, or a change in an activity level of the plurality of computing resources;
    modifying, based on the value, the first trigger condition to obtain a second trigger condition, wherein modifying the first trigger condition includes at least one of:
    changing the first statistical calculation to a second statistical calculation, or
    changing the first defined number of time periods to a second defined number of time periods;
    obtaining a second plurality of time-ordered data points measuring the one or more performance characteristics of the plurality of computing resources; and
    determining whether the second plurality of time-ordered data points satisfies the second trigger condition.

5. The computer-implemented method of claim 4, wherein the first statistical calculation includes determining a percentile of the first plurality of time-ordered data points at a point in time, and wherein changing the first statistical calculation to the second statistical calculation includes selecting a different percentile to use for the second statistical calculation.

6. The computer-implemented method of claim 4, wherein the plurality of computing resources are associated with a region of a plurality of regions defined by the service provider network.

7. The computer-implemented method of claim 4, wherein the one or more performance characteristics include one or more of: central processing unit (CPU) utilization, memory utilization, network latency, network throughput, latency of particular types of network requests, disk space utilization, and disk input/output operations per second (IOPS).

8. The computer-implemented method of claim 4, further comprising:
    determining that the second plurality of time-ordered data points satisfies the second trigger condition; and
    performing one or more defined actions, the one or more defined actions including one or more of: generating a notification, modifying one or more of the plurality of computing resources, and launching additional computing resources.

9. The computer-implemented method of claim 4, wherein the value indicates the activity level of the plurality of computing resources and is based on a sample rate of the first plurality of time-ordered data points.

10. The computer-implemented method of claim 4, wherein the value includes one or more of: a number of the plurality of computing resources, a number of customers associated with the plurality of computing resources, a number of requests received by the plurality of computing resources.

11. The computer-implemented method of claim 4, further comprising modifying, based on the value, one or more properties of software associated with the plurality of computing resources.

12. The computer-implemented method of claim 4, further comprising causing display of a graphical user interface (GUI) including a graph representing the first plurality of time-ordered data points relative to the first trigger condition.

13. The computer-implemented method of claim 4, wherein the plurality of computing resources include one or more of: a physical server, a virtual machine (VM), an application, a service of the service provider network.

14. The computer-implemented method of claim 4, wherein the modifying is based on a machine learning model that determines a type of modification based on values indicating a number of computing resources or an activity level of computing resources.

15. A system comprising:
a plurality of computing resources managed by a service provider network and implemented by a first one or more electronic devices, the first one or more electronic devices including instructions that upon execution cause the plurality of computing resources to:
generate a first plurality of time-ordered data points measuring one or more performance characteristics of the plurality of computing resources, and
send the first plurality of time-ordered data points to a monitoring service of the service provider network; and
the monitoring service implemented by a second one or more electronic devices, the monitoring service including instructions that upon execution cause the monitoring service to:
obtain the first plurality of time-ordered data points measuring one or more performance characteristics of the plurality of computing resources,
determine whether the first plurality of time-ordered data points satisfies a first trigger condition by:
generating a plurality of time-ordered statistical values by applying a first statistical calculation to the first plurality of time-ordered data points, and
determining whether time-ordered statistical values from the plurality of time-ordered statistical values satisfy a threshold for a first defined number of time periods,
obtain a value indicating at least one of: a change in a number of computing resources in the plurality of computing resources, or a change in an activity level of the plurality of computing resources,
modify, based on the value, the first trigger condition to obtain a second trigger condition, wherein modifying the first trigger condition includes at least one of:
changing the first statistical calculation to a second statistical calculation, or
changing the first defined number of time periods to a second defined number of time periods,
obtain a second plurality of time-ordered data points measuring the one or more performance characteristics of the plurality of computing resources, and
determine whether the second plurality of time-ordered data points satisfies the second trigger condition.

16. The system of claim 15, wherein the first statistical calculation includes determining a percentile of the first plurality of time-ordered data points at a point in time, and wherein changing the first statistical calculation to the second statistical calculation includes selecting a different percentile to use for the second statistical calculation.

17. The system of claim 15, wherein the plurality of computing resources are associated with a region of a plurality of regions defined by the service provider network.

18. The system of claim 15, wherein the one or more performance characteristics include one or more of: central processing unit (CPU) utilization, memory utilization, network latency, network throughput, latency of particular types of network requests, disk space utilization, and disk input/output operations per second (IOPS).

19. The system of claim 15, wherein the value indicates the activity level of the plurality of computing resources and is based on a sample rate of the first plurality of time-ordered data points.

20. The system of claim 15, wherein the plurality of computing resources include one or more of: a physical server, a virtual machine (VM), an application, a service of the service provider network.

\* \* \* \* \*